(12) United States Patent
Dürbaum et al.

(10) Patent No.: US 7,408,270 B2
(45) Date of Patent: Aug. 5, 2008

(54) FORWARD CONVERTER

(75) Inventors: Thomas Dürbaum, Baiersdorf (DE); Georg Sauerländer, Aachen (DE); Cornelis Johannes Adrianus Schetters, Nijmegen (NL)

(73) Assignee: NXP B.V., Eindhoven (NL)

( * ) Notice: Subject to any disclaimer, the term of this patent is extended or adjusted under 35 U.S.C. 154(b) by 82 days.

(21) Appl. No.: 10/577,980

(22) PCT Filed: Oct. 28, 2004

(86) PCT No.: PCT/IB2004/052232

§ 371 (c)(1),
(2), (4) Date: May 1, 2006

(87) PCT Pub. No.: WO2005/043736

PCT Pub. Date: May 12, 2005

(65) Prior Publication Data

US 2007/0069582 A1    Mar. 29, 2007

(30) Foreign Application Priority Data

Nov. 4, 2003 (EP) .................................. 03104073

(51) Int. Cl.
H02J 1/00 (2006.01)
H02J 3/00 (2006.01)

(52) U.S. Cl. .......................................... 307/41; 307/81
(58) Field of Classification Search .............. 363/21.04, 363/21.08–21.09, 65, 67–69, 84, 86, 89–90; 307/38, 39, 41, 81
See application file for complete search history.

(56) References Cited

U.S. PATENT DOCUMENTS 5,521,807 A * 5/1996 Chen et al. ............... 363/21.04
5,528,481 A 6/1996 Caldeira et al.
6,977,823 B2 * 12/2005 Yang ............................ 363/17
7,218,081 B2 * 5/2007 Jang et al. .................... 323/266

FOREIGN PATENT DOCUMENTS

JP   10 052041   2/1998
JP   2002 084753 7/2002

* cited by examiner

*Primary Examiner*—Shawn Riley
(74) *Attorney, Agent, or Firm*—Peter Zawilski

(57) ABSTRACT

Usually, power supplies are not capable of switching off part of the outputs of a main power supply during stand-by. Due to this, stand-by power supplies are used in addition to operation power supplies. Consistent with an example embodiment, a forward converter is provided, including switches in the rectifier circuit thereof. Due to this, the rectifier circuits may be selectively switched on and off. Advantageously, this may allow that the main outputs of such a forward converter are switched off while on stand-by.

15 Claims, 2 Drawing Sheets

FORWARD CONVERTER

The present invention relates to the field of power conversion. In particular, the present invention relates to a forward converter and to a method of operating a forward converter.

A forward converter often supplies a plurality of outputs with associated rectifier circuits. These rectifier circuits may be provided with a winding, forming part of an isolating transformer. Furthermore, these rectifiers may be connected to one winding of a so called coupled inductor, which accomplishes a magnetic coupling with the other rectifier circuits. Each rectifier circuit may provide a different output voltage. These multiple outputs may be regulated via a cross regulation using a coupled output inductor. Each output may be connected to its own inductor.

Furthermore, each of the rectifier circuits may be provided with its own rectifier diode and freewheeling diode. One of the output voltages of the plurality of rectifier circuits may be directly regulated by a duty cycle generated by means of a primary side switch. The output voltages of the other rectifier circuits are then only cross regulated. In order to improve the regulation of these other output voltages, the output inductors may be coupled, as already indicated above.

Due to the coupling of the output inductors, the whole forward converter is either completely switched on or completely switched off. A problem may then occur in case a stand-by mode (i.e. a stand-by voltage) has to be provided by the forward converter during which all other voltages have to be zero (or at least at a very low voltage).

It is an object of the present invention to provide an improved forward converter.

In accordance with an exemplary embodiment of the present invention as set forth in claim 1, a forward converter is provided, comprising a first rectifier circuit having a first output and a second rectifier circuit having a second output. A first switch is provided in the first rectifier circuit and a second switch is provided in the second rectifier circuit. According to an aspect of the present invention, by switching the first and second switches, the first and second outputs may be selectively switched off.

In other words, in case the first rectifier circuit outputs a first voltage and the second rectifier circuit is adapted to output a second voltage, either one of the two rectifier circuits may be completely switched off, while the other provides the respective voltage.

According to another exemplary embodiment of the present invention as set forth in claim 2, a third rectifier circuit is provided, which is coupled to the first rectifier circuit by means of a coupled inductor.

Advantageously, this may allow for a cross-control or cross-regulation of the output voltage of the third rectifier circuit, while the first and third rectifier circuits on the one hand and the second rectifier circuit on the other hand may be selectively switched off.

According to another exemplary embodiment of the present invention as set forth in claim 3, windings of the first and second rectifier circuits are associated with the same transformer.

According to another exemplary embodiment of the present invention as set forth in claim 4, the forward converter is adapted for connection to a device. When the first switch is closed, i.e. is conducting, and the second switch is open, i.e. is not conducting, the first rectifier provides an operation voltage for the device and wherein, when the first switch is open and the second switch is closed, the second rectifier provides a stand-by voltage for the device. Advantageously, this allows that, for example, during the stand-by mode of the device, the first rectifier circuit providing the operation voltage for the device is completely switched off. Advantageously, this ensures a required security for the device. Furthermore, by this, a separate stand-by power supply, as often used, is not necessary, since the stand-by power supply and the operation power supply are both incorporated in one forward converter, which, as mentioned above, allows for a complete shut-off of the respective voltages. Advantageously, this may allow to reduce the space required for the power supply. Furthermore, this may also allow to reduce costs associated with the power supply.

According to another exemplary embodiment of the present invention as set forth in claim 5, the forward converter is part of a PC power supply and the device is a PC.

According to another exemplary embodiment of the present invention as set forth in claim 6, a third switch, is provided between a rectifier circuit coupled to the first rectifier circuit by means of a common output inductor and the second rectifier circuit. Instead of the third switch, a diode, such as e.g. a Schottky diode or a linear controller may be provided. According to an aspect of this exemplary embodiment of the present invention, this switch is closed during operation when the first rectifier circuit provides the operation voltage and is open during operation when the second rectifier circuit provides the stand-by voltage.

According to another exemplary embodiment of the present invention as set forth in claim 7, the first switch is a bi-directional switch. For example, a diode and the first switch of the first rectifier may be replaced/implemented by such a bi-directional switch. Furthermore, according to an aspect of this exemplary embodiment of the present invention, each rectifier coupled to the first rectifier by the coupled inductor, may be provided with a diode or a synchronous rectifier such as a MOSFET.

According to another exemplary embodiment of the present invention as set forth in claim 8, a method is provided for the operation of a forward converter, where first and second outputs of first and second rectifier circuits are selectively switched off by operating first and second switches provided in the first and second rectifier circuits.

Advantageously, the may allow to operate a forward converter providing a plurality of output voltages, here, for example, two voltages, such that these voltages may be presented completely separate from each other, i.e. one voltage may be provided, while the rectifier circuit providing the other voltage is completely switched off.

Claims 9 to 11 provide for further exemplary embodiments of the method according to the present invention.

It may be seen as the gist of an exemplary embodiment of the present invention that switches are provided in the rectifier circuits of a forward converter allowing for a selective off-switching of selected rectifier circuits. By this, for example, the main outputs of the forward converter may be completely switched off during stand-by, whereas a rectifier circuit of the same forward converter ensures a stand-by power supply.

These and other aspects of the present invention will become apparent from and elucidated with reference to the embodiments described hereinafter.

Exemplary embodiments of the present invention will be described in the following, with reference to the following drawings.

Figure 1:
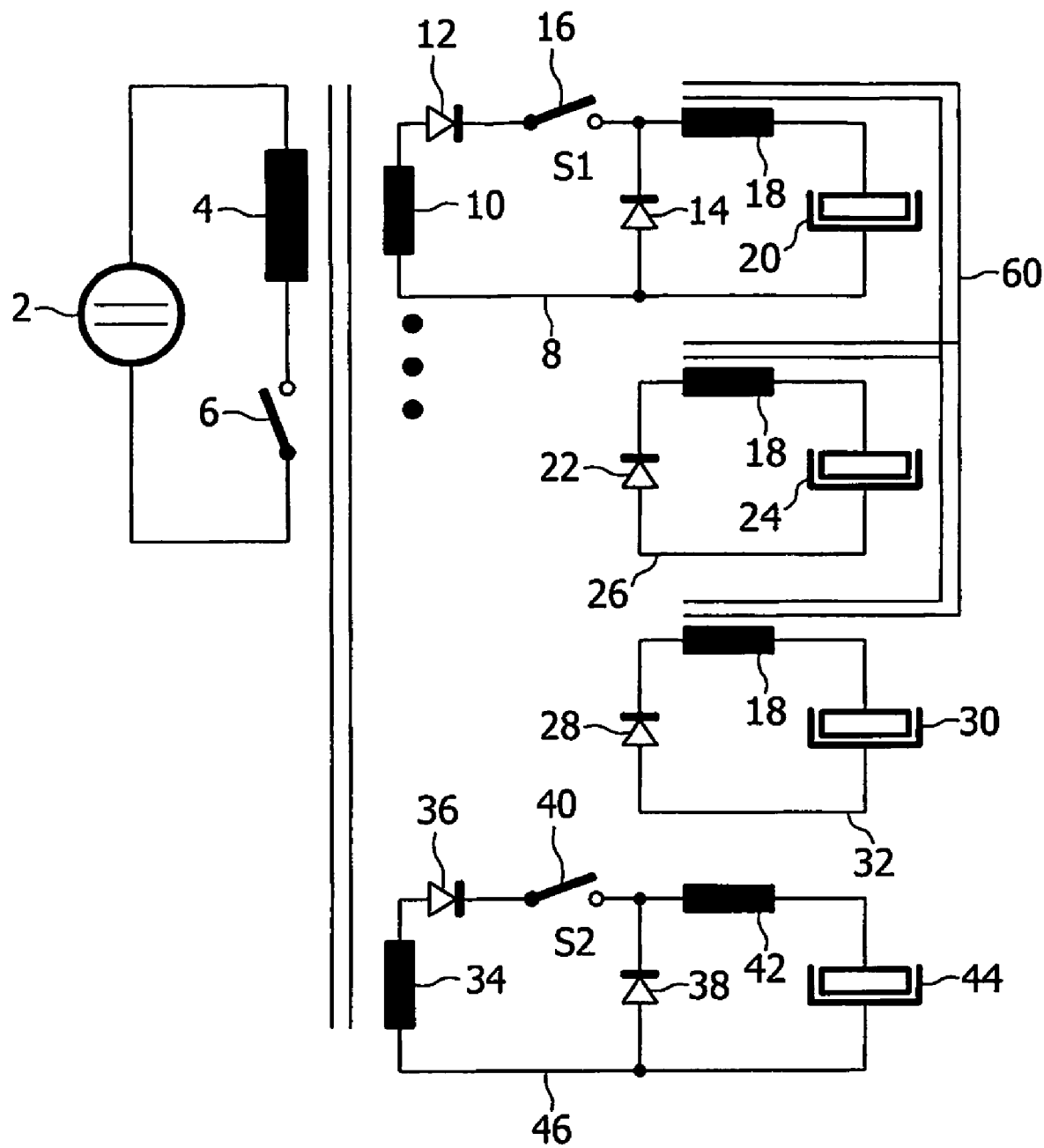
FIG. 1 shows a simplified circuit diagram of a forward converter according to a first exemplary embodiment of the present invention.
Figure 2:
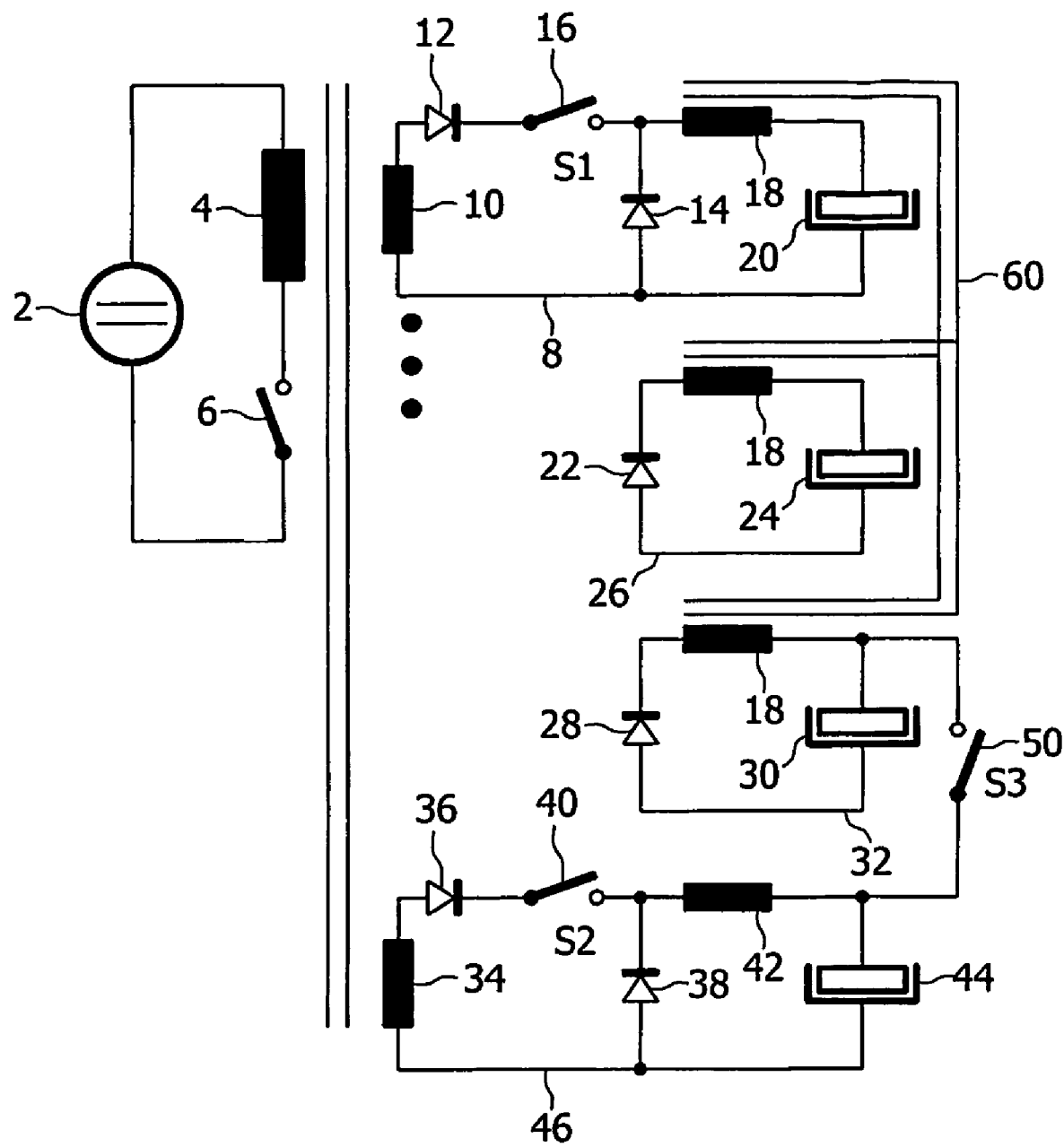
FIG. 2 shows a simplified circuit diagram of a forward converter according to a second exemplary embodiment of the present invention.

Throughout FIGS. 1 and 2, the same reference numerals are used for the same or corresponding elements.

FIG. 1 shows a simplified circuit representation of a forward converter according to a first exemplary embodiment of the present invention. Reference numeral 2 designates a power source such as a voltage source, one side of which is connected directly to an primary winding of transformer 4 and the other side of which is connected to another side of the inductor 4 via a switch 6. The primary winding 4 forms a transformer together with a winding 10 of a first rectifier circuit 8 and a winding 34 of another rectifier circuit 46 with the winding ratio of primary and secondary side windings of the transformer indicate the respective transformation ratio.

The first rectifier circuit 8 comprises the winding 10, which is connected via a first diode 12 and switch S1 designated by reference number 16 to an inductor 18. The inductor 18 is furthermore connected via an electrolyte capacitor (Elko) to a further diode 14 arranged between the Elko 20 and a point between the switch S1 and the inductor 18. An anode of the diode 14 is connected to the winding 10. An output voltage of the first rectifier circuit 18 may be taken across the Elko 20.

As may be taken from FIG. 1, the inductor 18 is connected to inductors 18 in further rectifier circuits. In FIG. 1, the inductor 18 is connected to an inductor 18 in a second rectifier circuit 26 and to an inductor 18 in a third rectifier circuit 32. Such coupling of the inductors 18 is referred to as output inductor coupling and is indicated in the Figures by reference numeral 60.

As may be taken from FIG. 1, the rectifier circuit 26 comprises a further diode 22 and a further Elko 24. Also, the third rectifier circuit 32 comprises a further diode 28 and a further Elko 30.

Furthermore, there is provided a fourth rectifier circuit 46. Except for the coupled output inductor, the fourth rectifier circuit 46 has the same circuit arrangement as the first rectifier circuit 8 and contains also a secondary winding of the transformer. In detail, the fourth rectifier circuit 46 comprises a winding 34 (forming a transformer together with the winding 4), which is connected via a diode 36 and a switch 40 to another inductor 42. Furthermore, the inductor 42 is connected via an Elko 44 to an anode of a diode 38, the cathode of which is connected between the switch S2, designated by reference numeral 40, and inductor 42. The anode of the diode 38 is furthermore connected to the winding 34.

The first, second and third rectifiers 8, 26 and 32, the output voltages of which can be taken across the Elkos 20, 24 and 30, are adapted to provide operation voltages for a device. The fourth rectifier circuit 46, the output voltage of which can be taken across the Elko 44, is adapted such that it provides one power supply voltage of a device, typically for stand-by operation.

As may be taken from FIG. 1, all main outputs (i.e. the voltages across Elkos 20, 24 and 30 of the first, second and third rectifier circuits 8, 26 and 32) are supplied via one secondary winding (coupled inductors 18 or common winding 18). In the first and fourth rectifier circuits 8 and 46, the windings 10 and 34 of which form a transformer together with the inductor 4, each comprise a switch behind the rectifier diode 12 and 36. By selectively switching these switches S1 and S2, designated by reference numerals 16 and 40, the first, second and third rectifier circuits 8, 26 and 32, ensuring the operation power supply of a device, can be switched off while, by keeping switch S2 of the fourth rectifier circuit 46 closed, a stand-by power supply is ensured by the fourth rectifier circuit 46. Due to this, a provision of the stand-by power supply by the same forward converter, which provides the power during operation, can be ensured, where all other outputs are completely switched off.

According to an aspect of the present invention, the switches S1 and S2 may be adapted to switch every cycle of the duty cycle determined by a switching of the switch 6, or switches S1 and S2 may be adapted as static switches.

According to a further aspect of this exemplary embodiment of the present invention, the switch S1 (reference numeral 16) is an HF switch. In that case, switch S1 will switch every switching period of the duty cycle determined by the switching of switch 6. This may allow to control or regulate the outputs (i.e. output voltages) of the first, second and third rectifier circuits 8, 26 and 32 independently of the fourth rectifier circuit 46. Thus, controlling the uncoupled output, i.e. the fourth rectifier circuit 46 via duty cycle switch S2, is not necessary in all cases, while all outputs are still controlled or regulated.

Of course, by using switch S2, the output voltage of the fourth rectifier circuit 46 may also be controlled and the duty cycle may regulate the main outputs, i.e. the output voltages of the first, second and third rectifier circuits 8, 26 and 32.

According to a further aspect of this exemplary embodiment of the present invention, the HF switch may be used in combination with reset schemes, such as, for example, an active clamping, which may lead to a zero voltage switching (ZVS) of the main switch (here switch S1).

According to a further aspect of this exemplary embodiment of the present invention, the rectifier diodes, i.e. the diodes 14, 22 and 28 in the rectifier circuits 8, 26, 32 and also diode 38 in rectifier circuit 46 may also be replaced by a synchronous rectifier element such as a MOSFET.

Furthermore, according to another exemplary embodiment of the present invention, which may allow for a very accurate control, the diode 12 and the switch 16 may be replaced by a bi-directional switch. This exemplary embodiment may also be combined with the embodiment described above, where the diodes 14, 22, 28 and/or 38 are partly or all replaced by a synchronous rectifying element such as a MOSFET.

FIG. 2 shows a simplified circuit representation of a forward converter according to a second exemplary embodiment of the present invention. As may be taken from FIG. 2, the circuit arrangement of the second exemplary embodiment of the present invention depicted in FIG. 2 is similar to the circuit arrangement of the first exemplary embodiment of the present invention depicted in FIG. 1, except that there is provided a further switch S3, designated by reference numeral 50, between the third rectifier circuit 32 and the fourth rectifier circuit 46. In FIG. 2, switch S1 is turned on during normal operation, i.e. when the forward converter provides the operation voltages to a device such as, for example, a personal computer (PC).

A control or regulation of the output voltages of the first, second and third rectifier circuits 8, 26 and 32 is accomplished via a control of the duty cycle, i.e. via control of the switching of the switch 6. Since, in this case, the uncoupled stand-by output, i.e. the output of the fourth rectifier circuit 46 may not be regulated or controlled well enough, the switch S3 designated by reference numeral 50 is provided, coupling one of the outputs of the first group to one of the outputs of the second groups (in principles also several first to several second possible, even one first to several second) to the fourth rectifier circuit 46. Switch S2 is off during normal operation, i.e. during operation where the first, second and third rectifier circuits provide the output voltages. During stand-by operation, i.e. when the first, second and rectifier circuits 8, 26 and 32 should be completely shut off and the fourth rectifier circuit 46 provides the stand-by voltage, switches S1 and S3 are opened while switch S2, which, according to this aspect of the present invention is a static switch, is closed.

According to variants of the above exemplary embodiment of the present invention, burst mode, frequency reduction etc. are also possible to gain better part load efficiency.

According to an aspect of the above exemplary embodiments, the freewheeling diodes in the rectifier circuits connected to the common winding 18 may be replaced by synchronous rectifiers. Furthermore, the other freewheeling diodes in the rectifier circuits may also be replaced by synchronous rectifiers. This may allow for further freedom to control or regulate different output voltages. Furthermore, this may allow to increase the efficiency of the circuitry.

According to another aspect of the above described exemplary embodiments, groups may be found which are clustered by one switch, allowing for a selective on and off switching of respective groups. It may also be possible to provide single outputs with switches, such that single outputs may be switched off, as described above. Thus it would also be possible to build every rectifier circuit of the first group with its own switch (combination diode plus switch or bi-directional switch)

Advantageously, the above described exemplary embodiments may allow to integrate a stand-by power supply within the main power supply, which may significantly reduce the costs required for the power supply of a device. This may be particularly advantageous in the case of PC power supplies.

The invention claimed is:

1. A forward converter adapted for connection to a device, the forward converter comprising:
   a first rectifier circuit having a first output;
   a second rectifier circuit having a second output;
   wherein a first switch is provided in the first rectifier circuit; and
   wherein a second switch is provided in the second rectifier circuit;
   wherein, by switching the first and second switches, the first and second outputs may be selectively switched off,
   wherein, when the first switch is closed and the second switch is open, the first rectifier provides an operation voltage for the device; and
   wherein, when the first switch is open and the second switch is closed, the second rectifier provides a stand-by voltage for the device.

2. The forward converter of claim 1,
   wherein a third rectifier circuit is provided;
   wherein the third rectifier circuit is connected to the first rectifier circuit by a coupled inductor.

3. The forward converter of claim 1,
   wherein the first and second rectifier circuits each have a winding;
   wherein the windings of the first and second rectifier circuits are associated with the same transformer.

4. The forward converter of claim 1, wherein the forward converter is part of a PC power supply and the device is a PC.

5. The forward converter of claim 1,
   wherein a fourth rectifier circuit is provided;
   wherein a third switch is provided in a connection between the fourth rectifier circuit and the second rectifier circuit;
   wherein the third switch is closed during operation when the first rectifier circuit provides the operation voltage and wherein the third switch is open during operation when the second rectifier circuit provides the stand-by voltage.

6. The forward converter of claim 1, wherein the first switch is a bi-directional switch.

7. Method of operating a forward converter adapted for connection to a device, the forward converter having a first rectifier circuit having a first output and a second rectifier circuit having a second output,
   wherein a first switch is provided in the first rectifier circuit, and
   wherein a second switch is provided in the second rectifier circuit, the method comprising the step of
   selectively switching off the first and second outputs by switching the first and second switches such that when the first switch is closed and the second switch is open, the first rectifier provides an operation voltage for the device, and when the first switch is open and the second switch is closed, the second rectifier provides a stand-by voltage for the device.

8. The method of claim 7, wherein a third rectifier circuit is provided, the method further comprising the step of:
   operating the third rectifier circuit and the first rectifier circuit by a coupled inductor.

9. The method of claim 7,
   wherein a fourth rectifier circuit is provided, wherein a third switch is provided in a connection between the fourth rectifier circuit and the second rectifier circuit, the method further comprising the step of:
   operating the third switch such that it is closed during operation when the first rectifier circuit provides the operation voltage and open during operation when the second rectifier circuit provides the stand-by voltage.

10. The forward converter of claim 1, further comprising a fourth rectifier circuit connected to the third rectifier circuit by a coupled inductor.

11. The forward converter of claim 1, wherein the first switch is a high frequency switch.

12. The forward converter of claim 1, wherein the first switch is regulated by a duty cycle of a power source switch.

13. The forward converter of claim 12, wherein the second switch is adapted as a static switch.

14. The forward converter of claim 1, wherein the first switch and the second switch are static switches.

15. The forward converter of claim 1, wherein the first switch and the second switch are not adapted to switch with cycles of a duty cycle.

* * * * *